United States Patent [19]

Bagley

[11] 4,114,558

[45] Sep. 19, 1978

[54] MEASURING INSTRUMENT INDICATING MECHANISM

[75] Inventor: Peter Edward Bagley, Bix. Nr. Henley-on-Thames, England

[73] Assignee: Airflow Developments Limited, England

[21] Appl. No.: 795,608

[22] Filed: May 10, 1977

[30] Foreign Application Priority Data

Apr. 26, 1977 [GB] United Kingdom ............... 17387/77

[51] Int. Cl.² .................... G01D 13/00; G01L 19/10
[52] U.S. Cl. .......................... 116/114 PV; 73/432 A;
73/715; 116/129 A; 116/136.5
[58] Field of Search ............... 73/432 A, 406, 410,
73/715; 116/136.5, 114 PV, 129 A; 324/151 R, 156 PB

[56] References Cited

U.S. PATENT DOCUMENTS

| 2,509,593 | 5/1950 | Goddard | 73/432 A |
| 2,571,488 | 10/1951 | Rooney | 116/136.5 X |
| 3,015,951 | 1/1962 | Ochs, Jr. | 116/136.5 X |
| 3,977,248 | 8/1976 | Metzger | 73/432 A X |

FOREIGN PATENT DOCUMENTS

46,537  8/1927  Norway .................................. 73/432 A

*Primary Examiner*—Daniel M. Yasich
*Attorney, Agent, or Firm*—Toren, McGeady and Stanger

[57] ABSTRACT

In a measuring instrument of the kind in which an axial movement of an input member is required to be converted into a rotary movement of an indicating member, such as a pointer movable across a scale, the input member acts against a cantilever mounted spring. The indicating member is pivotably mounted adjacent the free end of the spring for angular motion in a plane substantially perpendicular to the plane of deflection of the spring by the input member. Co-operating means, respectively on the indicating member and the free end of the spring, are magnetically attracted into contact with each other for converting motion of the spring into motion of the indicating member and preferably these co-operating means are a cam or ramp of part helical configuration on the spring and a follower on the indicator, one or other of the cam or the follower being a magnet.

9 Claims, 1 Drawing Figure

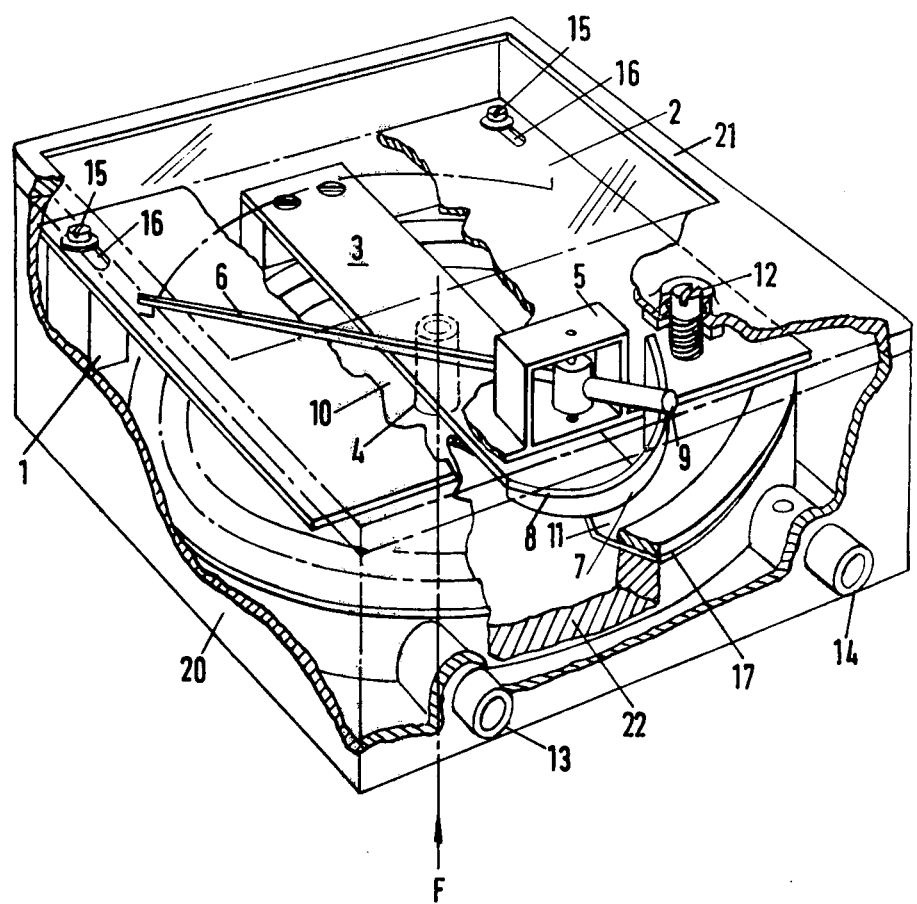

MEASURING INSTRUMENT INDICATING MECHANISM

This invention relates to measuring instruments of the kind in which an axial movement of a member caused by an input to the instrument is required to be converted into a rotary movement of an indicating member. A typical instrument of this kind is one in which the input member is a capsule which responds to changes in pressure and the indicating member is a pointer which is movable over a scale.

Existing mechanisms for converting axial motion into rotary motion in such instruments utilise small gears and levers and these have an inherent disadvantage by reason of the backlash between the faces which transmit the motion. This is usually overcome by the use of a delicate hair spring. Another disadvantage of existing mechanisms is that for a linear input, because of variable velocity ratios in the mechanism, the output is non-linear. The present invention has been devised with the general object of avoiding the abovementioned disadvantages of the known mechanisms.

In accordance with the present invention a measuring instrument of the kind referred to comprises an axially movable input member acting against a cantilever mounted spring, a movable indicator pivotally mounted adjacent the free end of the spring for angular motion in a plane substantially perpendicular to the plane of deflection of the spring by the input member, and co-operating means, which are held in contact by magnetic attractions, respectively on the indicator and the free end of the spring for converting motion of the spring into motion of the indicator.

Preferably the co-operating means are a cam or ramp of part helical configuration on the spring and a follower on the indicator one or other of the cam or the follower being a magnet.

The single FIGURE of drawing is a perspective view partially cut away illustrating an embodiment of the present invention.

A particular and at present preferred embodiment of the invention is illustrated in the accompanying drawing which is a part cut-away perspective view of a pressure measuring instrument which incorporates the invention and from which parts of the casing and input capsule have been removed for the purpose of illustration. Referring now to this drawing there is shown a casing 20 with a sealed-on cover 21. Inside the casing 20 is a base plate 1 which supports at one end a scale plate 2 and a cantilever mounted leaf spring 3 to the centre of which an upward perpendicular force F is applied by a rod 4 or other input means actuated by a sensitive diaphragm 11 with rigid centre plates 10 and which forms the top of a capsule 22 to which it is clamped by a ring 17. The casing 20 has pressure connections 13 and 14 passing through it, the former being intended to apply positive pressure to the capsule beneath the diaphragm 11 whilst the latter is intended to apply negative pressure above the diaphragm 11 within the sealed casing 20.

The scale plate 2 is secured to the base plate 1 by means of clamping screws 15 which pass through slots 16 in the scale plate. Thereby the scale plate 2 is longitudinally adjustable relative to the base plate 1 for a purpose hereinafter referred to. On the free end of the scale plate 2 there is mounted a bearing housing 5 in which a pointer 6, is pivotally mounted for swinging movement over and parallel with the scale plate 2. For a purpose hereinafter mentioned the scale plate may be adjustably flexed by turning a screw 12 sealingly mounted in the casing cover 21.

The free end of the cantilver spring 3 is formed with an upstanding lateral curved ramp 7 which is nominally perpendicular to its face and has a helically configured top cam surface 8. The pivot axis of the pointer 6 is nominally centred at the centre of the curve of the ramp 7 and the pointer 6 is counter balanced by a simple bar magnet 9 typically of circular cross-section carried at its end. Attraction between the magnet 9 and the curved ramp 7 causes the magnet, and hence the pointer to follow the shape of the cam surface 8 and swing across the face of the cantilever spring 3 and the scale plate 2 when the centre and free end of the spring 3 is displaced by movement of the rod 4 in response to pressure changes in the capsule. This magnetic attraction whereby the magnet and the ramp are continually in contact eliminates backlash.

Variations in the shape of the cam surface of the ramp can be made so as to yield variations in output relative to input.

If desired the cam surface 8 or the magnet 9 can be coated with a suitable low friction material such as polytetrafluorethylene.

It will be appreciated that calibration and zeroing adjustment of the instrument is necessary and that calibration—that is to say adjustment of the range of the instrument is a function of the combined effects of the area of the diaphragm the design of the spring and the geometry of the related parts.

Calibration is effected by loosening the screws 15, adjusting the scale plate 2 in the general direction of the slots 16 and re-tightening the screws 15. This adjustment changes the effective radius of the contact point between the magnet 9 and cam surface 8 and the pivot axis of the pointer and thereby changes the arc of movement for a given input whereby calibration is possible.

Zeroing of the instrument is accomplished by slightly flexing the scale plate 2 in the same direction as the spring 3 by turning the screw 12.

I claim:

1. A measuring instrument comprising an axially movable input member responsive to pressure acting to deflect a cantilever mounted spring, a movable indicator pivotally mounted adjacent the free end of the spring for angular motion in the plane substantially perpendicular to the plane of deflection of the spring by the input member, and co-operating means which are continually held in contact by magnetic attraction, respectively mounted on the indicator and the free end of the spring for converting deflection motion of the spring into the pivoted motion of the indicator.

2. A measuring instrument in accordance with claim 1 wherein the co-operating means are a cam surface of part helical configuration on the cantilever mounted spring and a follower on the indicator, one or the other of the cam surface and the follower being a magnet.

3. A measuring instrument in accordance with claim 2, in which the cam surface is profiled to impart to the follower a motion in relation to the input motion.

4. A measuring instrument in accordance with claim 1 wherein the said co-operating means are a cam surface of part helical configuration on the cantilever mounted spring and which forms part of a curved ramp which is nominally centred on the axis of rotation of said indicator, and a follower on the indicator, one or other of the cam surface or the follower being a magnet.

5. A measuring instrument in accordance with claim 1, in which the indicator is a pointer which is counterbalanced by a magnet at one end which engages a cam surface forming part of a ramp on the free end of the cantilever mounted spring.

6. A measuring instrument in accordance with claim 1, in which one or other of the co-operating means is coated with low friction material.

7. A measuring instrument in accordance with claim 1, in which the indicator is mounted on a scale plate which is adjustable in a directed substantially parallel with the longitudinal axis of the spring to vary the radial distance between the point of contact of the co-operating means and the pivotal axis of the indicator and thereby enable the instrument to be calibrated.

8. A measuring instrument in accordance with claim 1, including a scale plate having the indicator mounted thereon and means for adjustably flexing said scale plate to enable calibration of the indicator.

9. A measuring instrument comprising:

indicator means including an indicator arm;

pivot means mounting said indicator arm for pivotal motion about a pivot axis through a plane;

cam follower means on said indicator arm;

force receiving means for applying to said indicator arm a force whose magnitude is to be measured by said measuring instrument to pivotally actuate said arm to a position indicative of the magnitude of said force;

said force receiving means being arranged to receive said force along a direction extending transversely to said plane of motion of said indicator arm;

cam means movable in response to application to said force receiving means of said force whose magnitude is to be measured, said cam being contoured to thereby effect a desired displacement of said indicator arm by engagement with said cam follower means; and magnetic means for applying a magnetic force to continuously maintain said cam follower means and said cam means in engagement with each other to effect a pivoted displacement of said indicator arm in accordance with the contour and displacement of said cam means.

* * * * *